United States Patent [19]
Gooch

[11] 3,734,029
[45] May 22, 1973

[54] RESILIENT RAILWAY VEHICLE TRANSMISSION

[76] Inventor: John Henry Gooch, Goldsmiths, Albourne, Hassocks, Sussex, England

[22] Filed: Sept. 9, 1970

[21] Appl. No.: 70,854

[30] Foreign Application Priority Data

Sept. 22, 1969 Great Britain.....................46,662/69

[52] U.S. Cl. ................105/131, 105/132.1, 105/136
[51] Int. Cl...........B61c 9/32, B61c 9/36, B61c 9/40
[58] Field of Search...................105/131, 132.1, 136, 105/137, 139

[56] References Cited

UNITED STATES PATENTS

| 496,330 | 4/1893 | VanDepoele | 105/131 |
|---|---|---|---|
| 577,071 | 2/1897 | Schmid | 105/131 |
| 3,135,224 | 6/1964 | McLean | 105/136 |
| 2,698,526 | 1/1955 | Beier | 105/131 X |

Primary Examiner—Gerald M. Forlenza
Assistant Examiner—Howard Beltran
Attorney—Ernest A. Greenside

[57] ABSTRACT

The invention provides a railway locomotive, a driving wheel of which has its axle propelled by an electric motor positioned with its centre of gravity to one side of the axle said motor being resiliently supported from a frame such as a bogey in which said axle is sprung mounted the drive shaft of said motor being constrained to remain always parallel to said axle and coupled thereto by gearing and with a torsionally flexible driving connection between said shaft and said gearing the arrangement being such that vertical displacement of said axle relative to said frame due to said wheel encountering a track irregularity may occur without linear displacement of the centre of gravity of the motor or rotational displacement of the drive shaft of the rotor of said motor.

10 Claims, 7 Drawing Figures

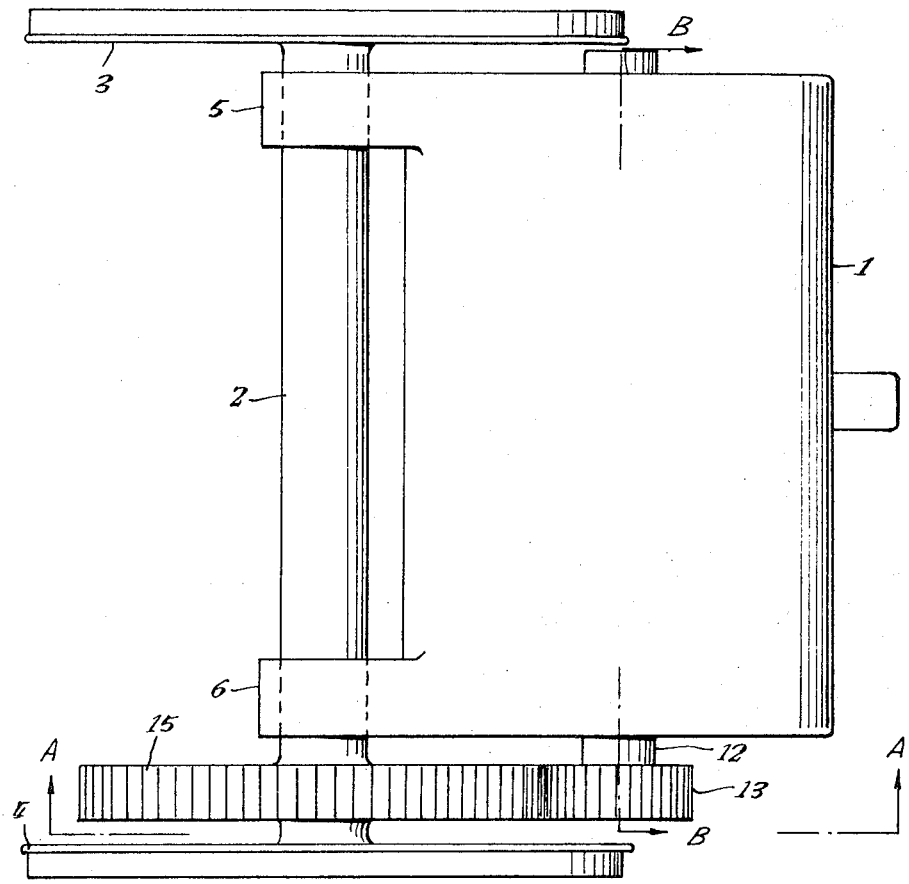
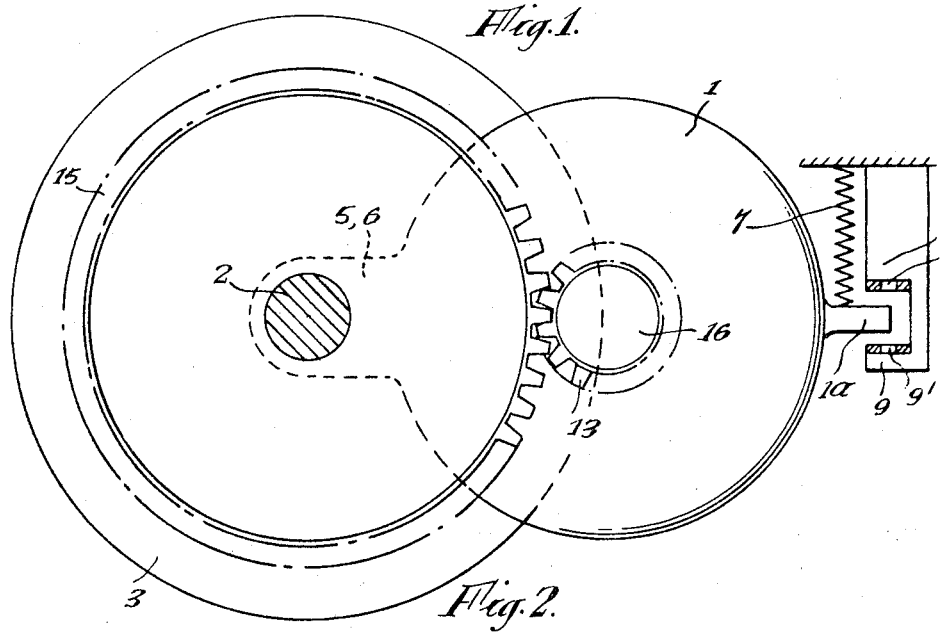

RESILIENT RAILWAY VEHICLE TRANSMISSION

The invention relates to the electric traction motors which drive the driving axles and wheels of railway vehicles such as diesel electric locomotives or locomotives or rolling stock operating on electrified routes, and in particular to the means of supporting such motors and of transmitting the drive from them.

It is customary to have one motor for each driven axle with its axis parallel to the wheel axle, and at about the same level and to one side thereof. The motor is supported on one side by two arms journalled on the wheel axle and on the other by attachment to the bogey or frame. The shaft of the armature projects from the side of the motor and on it is secured a pinion which meshes with a gear wheel mounted on the axle. It is also customary for the wheel axle with its pair of driving wheels to be connected to the bogey by spring mountings at each end. When either wheel passes over a track irregularity it causes a vertical displacement of the wheel, the spring adjacent to that wheel deflects and there is therefore relative vertical movement between the axle and the bogey.

An inherent feature of such an arrangement is that when a driving wheel passes over a track irregularity which causes a sudden vertical displacement of the wheel there is brought about a sudden displacement of the mass of the motor and a sudden rotational displacement of the inertia of the armature. The accelerating forces produced by these displacements manifest themselves partly in a momentary increased reaction between the wheel and the track, and substantially contribute to the "shock loading" on the wheel and the track which occurs when the wheel passes over such an irregularity.

The magnitude of this shock loading is a function of speed, and the appearance in recent years of appreciably faster locomotives and trains has caused it to become a matter of concern.

The invention described herein has as its object the provision of a means of supporting the motor and transmitting the drive from it whereby its contribution to the total shock loading at high speed is greatly reduced, and yet the conventional location of the motor on the axle is retained.

An inherent feature of electric motor driven vehicles is the wide variation in the driving torque of the motor and consequential motor bearing reaction, from the large torque when starting from rest to the low torque at top speed. It is only at relatively high speed that unsprung weight and shock loading is critical. A second objective of the invention described herein is the provision of a means of supporting the motor and taking the drive from it which has at low speed a characteristic of the necessary high strength and consequential relatively low flexibility and at high speed a characteristic of low but adequate strength and consequential high flexibility. By the provision of this dual characteristic the shock loading at high speed is further reduced.

According to the present invention there is provided a motor powered bogey of a vehicle of the kind in which the driving motor is mounted for movement about the axle, a pair of the driving wheels and the shaft of the motor and axle are coupled by spur gearing including a torsionally flexible driving connection wherein yieldable support means from the bogey is provided for said motor which yieldingly responds to movement of said motor about said axle at least over the available torque range of said motor at and near full operating speed. The support means may be a spring and stop means or less yieldable support means such as additional springs may be provided to resist movement by torque outside said range. The stiffness of the spring is then such that when maximum starting torque is applied, with the train stationary, the bearing reaction arising from the load on the pinion will cause the motor to travel up to a said stop or less yieldable support means and the spring will not lift it off said stop or said less yieldable support means until the driving torque has fallen below that corresponding to full power at some intermediate speed, (for example one third of top speed). Suspension of the motor through an arrangement of resilient material, for example rubber, may be used instead of, or in addition to, the springs. The torsionally flexible driving connection may be a torsionally yieldable shaft or torsionally flexible coupling or a gear wheel having a torsionally yieldable member coupling the hub of the gear wheel to a toothed rim mounted on said hub for relative angular movement.

In an alternative arrangement the torsionally flexible drive between armature shaft and pinion is omitted. The pinion is solidly fixed to the armature shaft, and the gear wheel which is mounted on the axle and meshes with pinion is not solid but provided with torsionally flexible means drivably connecting the centre of the wheel with the rim of the wheel, and also a means of connecting the wheel centre to the wheel rim which is automatically brought into driving engagement when the torsionally flexible means has deflected to the permitted maximum, the second means being either of an unyielding or resilient nature. To increase torsional flexibility two or more torsionally flexible driving connections may be arranged in series.

In the preferred form the shaft of the motor armature projects from the side of the motor and on it is mounted a pinion which is not secured to the shaft but may rotate on it, so that differential rotational movement can occur between the pinion and the armature shaft upon which it is mounted. The pinion meshes with a gear wheel mounted on the axle. The pinion is drivably connected to the armature by a means which embodies a degree of torsional flexibility, such as a torsionally flexible coupling or a long torsion shaft and which means torsionally distorts to the permitted maximum when transmitting a torque corresponding to full power at some intermediate speed (for example, one third of top speed). The pinion is also connected to the armature by a means, which may be embodied within the aforesaid means or may be different from it, which automatically comes into driving engagement when the aforesaid means has torsionally distorted to the permitted maximum. Both of these two means being operable in both directions of rotation.

A particular example of the invention is now with reference to the following figures:

FIG. 1 is a plan view showing disposition of the motor and gears relative to the vehicle wheels and axle;

FIG. 2 is a section on line A—A of FIG. 1 showing the sprung suspension of the motor;

Figure 3:
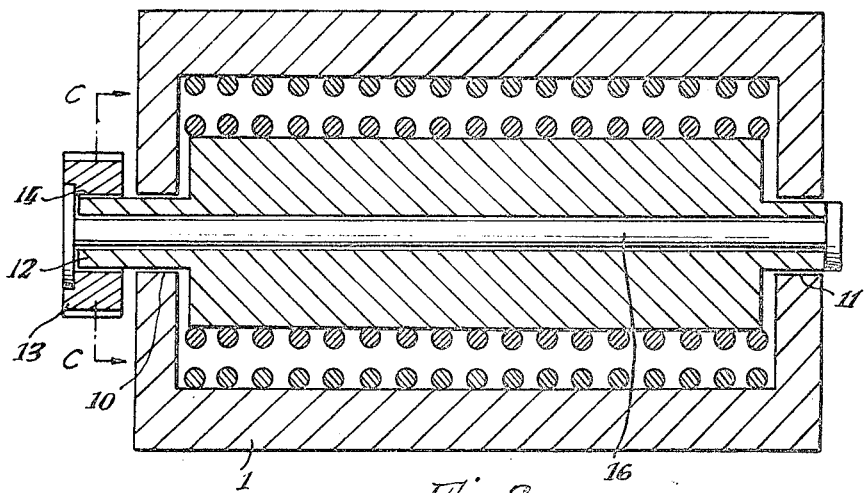
FIG. 3 is a section on line B—B of FIG. 1 showing the pinion, motor, fiend and armature windings and the torsion shaft which is the torsionally flexible connection between the armature and pinion.

Referring now to FIGS. 1 and 2, the motor 1, the housing of which is provided with a tongue 1a, is journalled on the axle 2 of the driving wheels 3 and 4 of the vehicle by guide means comprising arms 5 and 6. The axle 2, as previously indicated to be customary, may be connected to the bogey or frame by spring mountings at each end, only one of which is shown in FIG. 2 at 6″. On the side opposite the side at which the motor housing is journaled on the axle, the motor is suspended from the bogey 6′ by spring 7, but the motor's freedom to rotate about the axle 2 compressing or extending the spring 7, is restricted by the tongue 1a on the motor housing positioned between stops 8 and 9 also attached to the bogey. The stiffness of the spring 7 is such that when a torque corresponding to full power at some intermediate speed, (for example, one third of top speed) is being transmitted the reaction on the motor bearings arising from the gear load will stretch or compress the spring sufficiently to just bring the motor to the limit of its travel against stop 8 or 9. Resilient pads 8′ and 9′ are mounted on the faces of the stops 8 and 9 respectively. Instead of resilient pads the spring means may comprise a plurality of springs for example spiral springs of unequal length mounted concentrically which come into action consecutively outside the torque available at full speed.

Referring now to FIG. 3, the rotating parts of the motor are supported in the customary manner by bearings 10 and 11, and on one side of the motor the armature shaft 12 projects from the side of the motor and on it is mounted a pinion 13. The interface 14 between the armature shaft 12 and pinion 13 is a bearing surface so that relative rotational movement may occur between pinion 13 and armature shaft 12. The pinion 13 meshes with gearwheels 15 (see FIGS. 1 and 2) which is mounted on and secured to the axle 2. A hole extends right through the centre of the rotating parts of the motor and in this lies, in loose contact with the wall of this hole, a torsion shaft 16 connected at one end to the pinion 13 and at the other to the opposite end of the rotating part of the motor, thus providing the torsionally flexible drive between armature and pinion.

Figure 4:
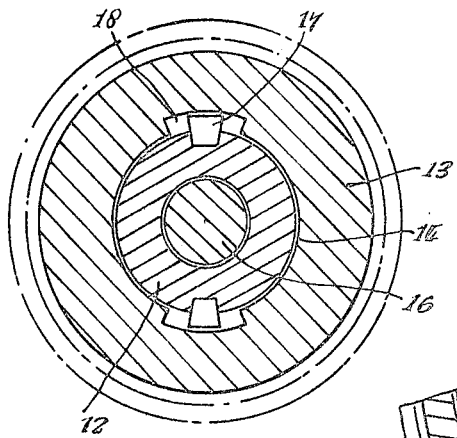
FIGS. 4, 5 and 6 are sections on the line C—C of FIG. 3 showing to an enlarged scale the keyed connection between the armature shaft and pinion which forms the other driving connection between them, and showing in the three figures their relative dispositions at different conditions of power and speed.
Figures 5, 6:
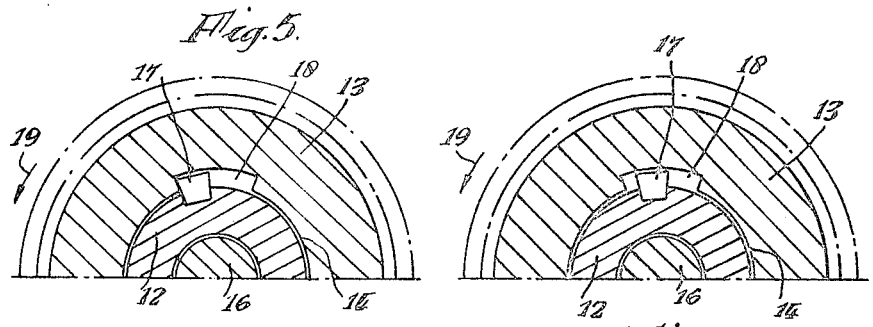

Referring now to FIGS. 4, 5 and 6 there are one or more keys 17 set in the armature shaft 12 which project into recesses 18 cut into the pinion 13. These recesses 18 are wider than the keys 17 thus allowing a certain amount of differential rotational movement to occur between the pinion 13 and armature shaft 12. The width of each recess is such that when a sufficient relative rotation between shaft 12 and pinion 13 has occurred to bring the keys 17 into contact with the sides of the recesses 18, as shown in FIG. 5, the torsion shaft has been twisted to the permitted maximum and this induces in it a torque corresponding to the full power torque at a certain intermediate speed, (for example one third of top speed). This provides the second drive between armature and pinion which comes automatically into driving engagement when the torsionally flexible drive has torsionally distorted to the permitted maximum.

The mode of operation is now described. When the vehicle starts from rest torque is applied by the motor and it is common for this starting torque to be very large. The torsion shaft 16 twists to the permitted maximum and bringing the keys 17 into contact with one side of the recesses 18 so that much of the total torque is transmitted direct from the armature shaft 12 to the pinion 13 through the keys 17 as is shown in FIG. 5, where the arrow 19 denotes the direction of drive. The gear tooth force between the pinion 13 and the gearwheel 15 is large with a corresponding large reactive force at the bearing 10 causing the whole motor 1 to rotate about the axle 2, compressing spring 7 until the motor 1 is hard against the pad 8′ on the stop 8. This situation continues whilst the vehicle is travelling at low speeds and the driving torque remains high. At these low speeds shock loading arising from the unsprung weight of the motor and armature inertia is not a matter of concern. When an intermediate speed is reached (for example one third of top speed) the full power driving torque has fallen to a value corresponding to what the torsion shaft 16 will transmit, and similarly the bearing 10 reaction will have fallen to a value which spring 7 counteracts. As speed is further increased the driving torque falls further, torsion shaft 16 becomes less twisted, and the relative disposition of the armature shaft 12 and pinion 13 is as shown in FIG. 6. Similarly the motor will have been pushed away from stop 8 by spring 7 as the bearing 10 reaction becomes less.

Having considered the effect of a change of torque the effect of track irregularities will now be considered. When the wheel on the sprung axle 2 adjacent the gear wheel is suddenly lifted by an irregularity of the track, the gearwheel 15 is also suddenly raised, but the inertia due to the mass of the motor prevents the motor from rising suddenly in response both to the upward thrust imparted to the pinion 13 by the gear wheel 15 and the lifting of the axle 2. This applies torque to the torsion shaft 16 the twisting of which permits vertical movement of the gearwheel 15 relative to the pinion 13 as the axle 2 rises. As the gearwheel 15 and axle 2 are raised the motor stator is turned about its centre of gravity and the tongue 1a is displaced downwardly between the stops 8 and 9 (unless it is against the stop 9) and the spring 7 will be extended. The function of the spring 7 therefore is to enable the centre of gravity of the motor to remain substantially undisplaced, and the function of the torsion shaft 16 therefore is to enable the inertia of the armature to remain substantially undisplaced rotationally.

With these conditions appertaining at high speed the shock loading on the wheels and track when the vehicle passes over track irregularities arising from the mass of the motor and the inertia of the armature is greatly reduced and yet the location of the motor on the axle is retained.

With the above arrangement the pinion 13 is rotatably mounted on an extension of the armature shaft so that its axis is always coincident with the axis of the armature shaft 12.

Figure 7:
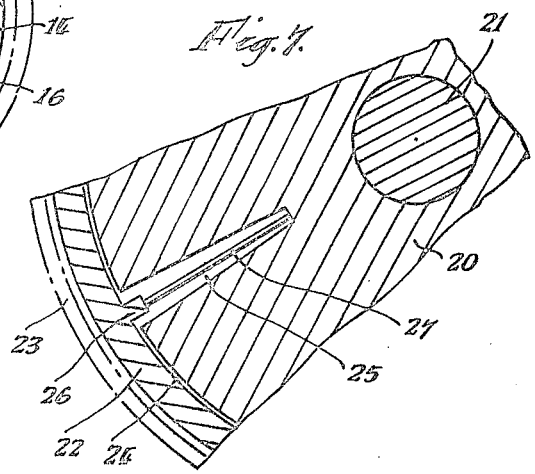
FIG. 7 is a fragmentary sectional view of a torsionally flexible driving connection.

Referring now to FIG. 7. In this figure the centre part 20 of the gear wheel, which is mounted on an axle 21, is in contact with the rim 22 of the gearwheel carrying the gear teeth 23, and the interface between the centre 20 and rim 22 is a bearing surface 24. A number of recesses 25, one of which is shown, are in the wheel centre 20 and in them are projections 26 from the rim 22 narrower than the recesses, thus allowing a certain amount of relative rotational movement between centre 20 and rim 22. Flat plate springs 27 connect centre 20 to rim 22, of flexibility such that when enough relative movement between centre 20 and rim 22 has occurred to bring the projections 26 into contact with the walls of the recesses 25 the springs 27 are transmitting a torque between rim and centre equivalent to full power at some intermediate speed, for example one third of top speed.

In this modified form the operation is as follows:

The large starting and low speed torques will bring the projections 26 into contact with the recess 25 walls and much of the total torque will be direct from rim 22 to centre 20 by this means. At the torque corresponding to full power at some intermediate speed, for example one third top speed, the springs 27 will transmit all the torque and for lesser torques and higher speeds the springs 27 will deflect less lifting the projections 26 away from the recess 25 walls. Thus a torsionally flexible drive exists between rim 22 and centre 20 at these troques and speeds.

In an alternative arrangement similar to that described above, the motor's suspension from the bogey may be at one or more positions on the motor, instead of at the position described above, carrying part or all of the motor weight. The suspension may be flexible supports of adequate strength, with or without stops.

In a further alternative arrangement similar to that described above the connection between the armature and pinion or gear hub and rim which automatically comes into driving engagement when the torsionally flexible connection has distorted to the permitted maximum is omitted and the torsionally flexible connection is strong enough to transmit the maximum torque.

In a still further alternative arrangement the drive from the armature to the pinion consists of several torsion shafts concentrically mounted each incorporating limit stops which come progressively into driving connection as torque is increased. Alternatively the drive may embody a torsionally flexible coupling with a non linear flexibility characteristic, that is one which is torsionally more flexible when the torque is low than when it is high.

In an alternative arrangement the torsionally flexible driving connection between armature and pinion is a torsion shaft passing through the centre of the armature and in which the shaft of the armature at the pinion side of the motor does not pass through the bearing on that side of the motor as in the example illustrated in FIG. 3, but the torsion shaft itself is supported in that bearing the torsion shaft carrying part of the weight of the motor and transmitting it to the bearing.

With the embodiment of the invention described herein the object is achieved of providing means for supporting the motor and transmitting the drive from it whereby the conventional location of the motor on the axle is retained and yet its contribution to the total shock loading at high speed is greatly reduced and combine at low speed a characteristic of high strength and relatively low flexibility with a characteristic at high speed of low but adequate strength and high flexibility.

In a still further alternative arrangement similar to the above the suspension of the motor is not from the bogey but on an adjoining axle. For example in FIG. 2 the spring 7 and the part carrying the stops 8 and 9 can be supported from an adjacent axle constituting an indirect connection between said motor and said frame.

What I claim and desire to secure by Letters Patent is:

1. An electric motor and driving wheel assembly comprising a driving wheel axle having a gear wheel, an electric motor having an armature shaft and being supported for pivotal movement about said axle with the armature shaft disposed parallel to said axle and with its center of gravity located in a vertical plane to one side of the axis of said axle, and coupling means for coupling said shaft and said axle, said coupling means comprising gearing for meshing with said gear wheel on said axle and a solely torsionally flexible connection between said gearing and said shaft.

2. An assembly according to claim 1 wherein said torsionally flexible connection includes limit stops providing a positive driving connection when a predetermined torque is exceeded.

3. An assembly according to claim 1 wherein said torsionally flexible driving connection is a torsion shaft carrying a driving pinion rotatably supported on said armature shaft.

4. An assembly according to claim 1 wherein said torsionally flexible connection has a first flexibility for speeds of the motor below a predetermined speed thereof and a second flexibility above said predetermined speed.

5. An assembly according to claim 1 wherein said coupling means includes a lost-motion connection.

6. An electric motor and driving wheel assembly comprising a driving wheel and axle having a gear wheel, an electric motor having an armature shaft and supported for pivotal movement about said axle with the armature shaft disposed parallel to said axle and with its center of gravity located in a vertical plane to one side of the axis of said axle, and coupling means coupling said shaft on said axle, said coupling means comprising gearing for meshing with said gear wheel on said axle, a flexible connection between said gearing and said shaft and a lost-motion connection between said shaft and said gearing.

7. An electric motor driving whee' assembly comprising a driving wheel axle means adapted to drive wheels connected thereto over a track, an electric motor having an armature shaft means and supported for pivotal movement about said axle means with the armature shaft means disposed parallel to said axle means and with its center of gravity located in a vertical plane to one side of the axis of said axle means, a coupling for coupling said shaft on said axle means, said coupling including gears provided on at least said shaft means and on said axle means for interconnecting the same and further including a flexible connection between one of the gears and an associated one of said means permitting relative movement therebetween, and positive means for positively limiting the extent of relative movement between said one of said gears and said associated one of said means.

8. An assembly according to claim 7, wherein the gear on the axle means comprises a hub portion secured to the axle means and a toothed rim mounted on the hub, said flexible connection comprising at least one spring member connecting the axle means through the intermediary of the hub to said toothed rim.

9. An assembly according to claim 7 wherein said flexible connection comprises a torsion shaft carrying a driving pinion rotatably supported on the armature shaft.

10. An assembly according to claim 7, wherein said positive means comprises limit stops on one of said relatively movable parts.

* * * * *